Sept. 4, 1956  M. W. MARIEN  2,761,749
OIL CONTROL RING
Filed May 17, 1954
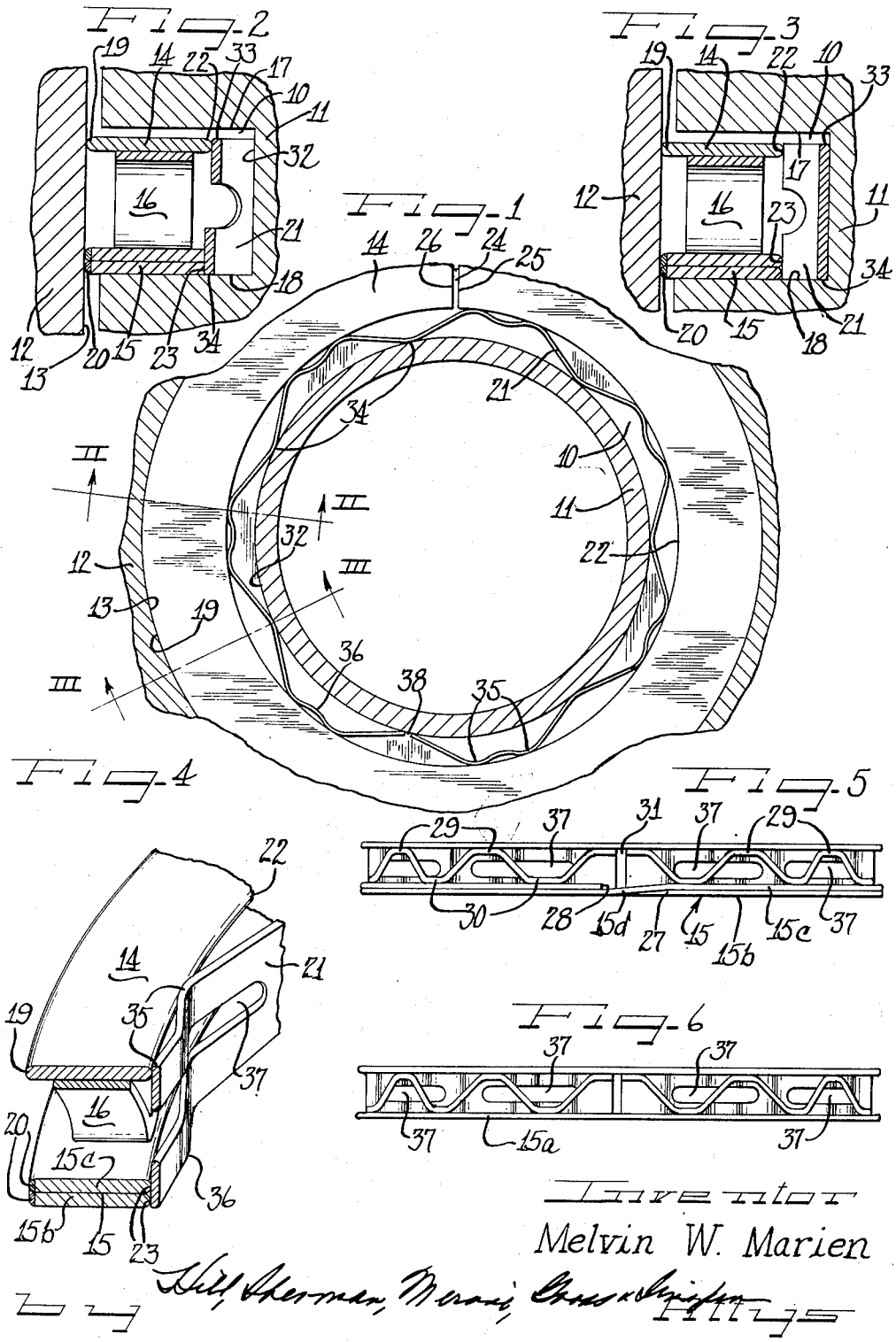
Inventor
Melvin W. Marien

United States Patent Office

2,761,749
Patented Sept. 4, 1956

2,761,749

OIL CONTROL RING

Melvin W. Marien, Brentwood, Mo., assignor to Ramsey Corporation, St. Louis, Mo., a corporation of Ohio Application May 17, 1954, Serial No. 430,165

6 Claims. (Cl. 309—45)

The present invention relates to an oil control ring, and more particularly, the present invention relates to an oil control piston ring assembly for disposition in an oil ring groove of a piston to be reciprocably disposed in a cylinder.

Still more particularly, the present invention relates to the type of oil control piston ring assembly wherein thin annular oil rings are maintained adjacent to the upper and lower faces of an oil ring groove in a piston and are also maintained outwardly expanded to engage the cylinder wall.

One of the principal features of the present invention is the provision of an expander ring which lies between the back wall of the oil ring groove and the inner peripheral edges of thin oil rings in multiple point engagement with each of the rings and with the back wall to expand the thin oil ring into engagement between the outer peripheries thereof and the cylinder wall. The expander ring in the oil ring of the present invention overcomes many of the deficiencies of the prior art by "backing up" the expander ring whereby it is provided with greater strength and greater resilience to thereby more certainly maintain the thin oil rings in peripheral engagement with the cylinder wall.

The action of the expander ring is still further enhanced in accordance with the principles of the present invention by longitudinally slotting the expander ring at least axially adjacent to the points of engagement thereof with the thin oil ring whereby the expander ring is operative to resiliently expand each thin oil ring substantially independent of expansion of the other thereof.

This further feature permits the efficient utilization of a relatively soft thin oil ring for quick break in, and a relatively hard thin oil ring for longer life. By utilizing a relatively soft thin oil ring, or an oil ring having a relatively soft outer peripheral region, the oil control ring assembly may have relatively quick break in since this ring will wear in quickly and seal the piston with the cylinder in the desired manner. If, in accordance with the principles of the present invention, the other thin oil ring is relatively hard or has a relatively hard outer peripheral region, it will wear in more slowly than the soft or quick break in ring, but will have a greater and more extended life.

By providing the oil ring assembly with an expander ring embodying the principles of the present invention, the two types of thin oil rings may be employed since the different wear rates of the thin rings will be compensated for by the expander ring which permits independent or substantially independent expansion of the two types of thin rings. Thus, while one of the rings will wear more quickly than the other thereof, both of the same may be maintained in firm peripheral engagement with the cylinder wall to thereby quickly break in the oil ring assembly and also provide the same with a long life thereby providing a most economical oil control piston ring assembly.

Another feature of the present invention which overcomes many of the deficiencies of the prior art, is the provision of a thin oil ring of multiple laps or turns to provide the equivalent of a plurality of thin oil rings without the complexity of using a plurality of thin oil rings and without the difficulties accompanying the utilization of an oil ring of a relatively large axial dimension which is difficult to expand and which will not operate to efficiently seal the piston and cylinder assembly over an extended period.

In accordance with the principles of the present invention, a multiple turn or multiple lap thin oil ring is provided in such a manner that it is operable to engage the cylinder wall as a plurality of juxtaposed thin oil rings which are easily expandable. Thin oil rings embodying the principles of this invention are provided with a plurality of laps or turns whereby the ring overlaps itself to provide a complete peripheral engagement with the cylinder wall.

This multiple turn thin oil ring may be the quick break-in ring but it is preferred that the multiple turn thin oil ring be the long life slow break-in ring.

The long life or slow break-in ring also may be a relatively hard seal ring or it may be a relatively soft ring having a perlitic structure, such as that of the quick break-in ring, with a chrome plating thereon or with chrome plated cylinder contacting edges, or it may be a relatively hard ring with or without chromized cylinder contacting edge. The long life slow break in ring also may be subjected to a case hardening treatment with or without chromizing the same.

These and other features and advantages of the present invention will become more readily apparent to those skilled in the art from the following detailed description, from the claims, and from the drawings which fully and completely disclose each and every part and detail shown thereon as a part of this specification, in which like reference numerals refer to like parts, and in which:

Figure 1 is a fragmental plan view of an oil control piston ring assembly embodying the principles of the present invention and shown in position in the oil ring groove of a piston disposed reciprocably in a cylinder, the piston and the cylinder being shown in section;

Figure 2 is a fragmental sectional view of the piston, cylinder and oil control piston ring of Figure 1 viewed as taken substantially along the line II—II of Figure 1;

Figure 3 is a fragmental sectional view of the piston, cylinder and oil control piston ring assembly of Figure 1, but shown as following a period of quick break-in of the oil control piston ring, and viewed as taken substantially along the line III—III of Figure 1;

Figure 4 is a fragmental perspective view of an oil control piston ring assembly embodying the principles of the present invention;

Figure 5 is an elevational view of the oil control piston ring assembly utilizing a multiple turn thin oil ring in accordance with the principles of the present invention; and, Figure 6 is an elevational view substantially identical to that of Figure 5 but showing the oil control piston ring assembly with single turn thin oil rings.

As shown on the drawings:

An oil control piston ring assembly embodying the principles of the present invention is of the type which is to be disposed in an oil ring groove 10 of a piston 11 which is reciprocably disposed in a cylinder 12 having a cylinder wall 13. The piston and cylinder arrangement may be one such as those found in hydraulic or pneumatic power devices or such as those found in internal combustion engines or the like or further may be such as those utilized for valve or other control elements or the like.

The oil control piston ring assembly is provided with a pair of thin oil rings 14 and 15 which are axially spaced by a spacer 16 to lie substantially adjacent to or against the upper and lower radial faces 17 and 18 of the oil ring groove 10 in the piston 11. The thin oil rings 14 and 15 are radially substantially co-extensive, with the outer peripheral edges 19 and 20 thereof respectively in sealing engagement with the cylinder wall 13 of the cylinder 12.

An expander ring 21 resiliently engages the inner peripheral edges 22 and 23 of the thin oil rings 14 and 15 respectively and urges the same radially outwardly against the cylinder wall 13. The thin oil rings 14 and 15 preferably have a relatively small axial dimension and a relatively large radial dimension so that they may have the proper physical characteristics.

One of the most important characteristics for the thin oil ring is that they provide a good and effective peripheral seal with the cylinder wall which they are to engage. To accomplish this end over an extended period, the thin oil rings should be radially expansible to compensate for wear on the outer peripheral edge thereof and on the cylinder wall. That the thin oil ring may be radially expansible, single turn thin oil ring, such as the ring 14, is provided with a radial cut or slit or slot such as the slot 24 (Fig. 1) in the thin ring 14 thereby leaving confronting ends 25 and 26 thereon. With the slot 24 cut in the thin ring 14, the thin ring 14, which is preferably formed as the quick break-in ring and which is preferably made of such a material as soft steel which may have a perlitic structure, is expansible by the action of radial forces acting outwardly against the inner peripheral edge 22 thereof.

Although the slow and harder long life thin ring 15 may be a single turn ring such as the thin ring 15a of Figure 6 and be efficiently operable with an oil control piston ring assembly embodying the principles of the present invention, the slow break-in long life thin ring 15 is preferably one of the multiple turns or laps 15b and 15c which are axially justaposed. It is preferred that the faces of the turns 15b and 15c which face each other be substantially together so that the thin ring 15 will have a minimum of axial resilience. The thin ring 15, however, should not have the axially facing faces of the turn 15b and 15c in such tight engagement that they will deter radial expansion and circumferential expansion of the ring by reason of friction between the faces discussed.

By leaving ends 27 and 28 of the thin ring 15 free and unsecured, the turns or laps 15b and 15c will be relatively free to slide circumferentially with respect to each other under the action of radially outward forces whereby the ring 15 will be expansible to maintain an efficient sealing with the cylinder wall 13 of the cylinder 12. By the provision of multiple turns in the thin ring 15, with a portion 15d joining the thin ring slats 15b and 15c, the thin ring 15 will have full and complete peripheral edge engagement with the cylinder wall 13 and further will engage the cylinder wall 13 substantially as a plurality (in this case a pair of juxtaposed thin oil rings).

Since the multiple sealing ring 15 is preferably one of the long life and slow break in ring, it is preferably formed of a relatively hard seal which may be case hardened and/or chromized or the like, or it may be formed of a relatively soft steel such as one having a perlitic structure and which is chrome plated or provided with chrome plated outer peripheral edges or the like.

The spacer ring 16 employed in the oil control piston ring assembly of the present invention may be any particular desired spacer ring which will support the thin rings substantially adjacent to or in axial engagement with the radial faces 17 and 18 of the oil ring groove 10. It is preferred, however, that the spacer ring 16 be of sufficiently limited axial dimension as to support the thin rings adjacent to the radial faces 17 and 18 but without tight engagement therewith so that there will not be strong frictional forces between the thin ring and the radial faces of the grooves.

Friction resulting from strong forces pressing the thin ring against the radial faces of the oil ring groove would tend to prevent expansion of the thin ring and thereby operate as a detriment to maintaining an effective seal between the radially outer peripheral edges of the thin ring and the cylinder wall.

The spacer ring 16 herein illustrated and described is preferably one which is substantially co-extensive with the thin ring, disposed therebetween, and longitudinally (generally vertically) corrugated with the upper crests 29 thereof lying in a plane substantially parallel to the plane in which the lower crests 30 lie so as to support the thin rings substantially parallel to each other. To provide for expansion of the spacer ring 16, when necessary, and to permit convenient removal of the spacer ring and replacement thereof over the piston, the expander ring is also provided with a cut, or slit, or slot 31.

The axial dimension of the spacer ring 16 is further so determined as to permit engagement of the inner peripheral edges 22 and 23 of the thin rings 14 and 15 respectively (or the thin rings 14 and 15a of Figure 6 respectively) with the expander ring 21. The expander ring 21 has an axial dimension preferably slightly less than the axial dimension in the oil ring groove 10 so as to prevent binding of the axial edges 33 and 34 thereof with the radial faces 17 and 18 of the oil ring groove. Such binding would tend to prevent expansion of the expander ring and thus would tend to prevent expansion of the thin rings 14 and 15.

The expander ring 21 is one which has an elevational polygonal configuration such as that of the type shown, described and claimed in my earlier Patent No. 1,869,108. That is, it is provided with a regular polygonal configuration having a plural pointed star shape whereby it engages the axial face or rear wall 32 of the oil ring groove 10 at a plurality of points or lines and further engages each of the thin oil rings at the inner peripheral edges thereof at a plurality of points or lines. In addition, the expander ring 21 is so formed that the crests thereof engaging the inner peripheries of the thin ring are slightly radially inwardly caved so that the contacting points with the said ring are substantially twice as great in number as the number of contacting points or lines of the expander ring with the wall 32 of the oil ring groove 10. Thus it may be seen that the expander ring is binodal between the points of engagement thereof with the inner wall of the oil ring groove in the piston.

In the embodiment of the invention herein illustrated, the expander ring contacts the rear wall 32 of the groove 10 at inner crests 34 and contacts the inner peripheral edges of the thin ring at outer crests 35 with small radially inward crests 36 between each pair of outer crests 35 so that the number of pairs of outer crests 35 are substantially equal in number to the number of inner crests 34.

By providing point contact or line contact between the expander ring 21 and the thin rings 14 and 15 and the axial face or wall 32 of the groove 10, there is a minimum of friction between the expander ring 21 and the other parts which it engages. Also, by fitting the expander ring between the thin ring and the back wall of the oil ring groove, as described, the expander ring is "backed-up" whereby it may apply all of its expanding forces against the thin ring and it is not required to expend any of the forces to sustain its own position.

Thus there is provided an efficient oil control piston ring assembly with an expander ring operable through multiple point contact to expand the thin rings resiliently against the cylinder wall 13 of the cylinder 12. The resilience of the expander ring is provided through the manner of its placement between the thin ring and the back wall 32 of the oil ring groove and the material from which the expander ring 21 is formed. This material is preferably one such as spring steel or the like.

In accordance with the principles of the present invention it is preferred to expand the thin rings substantially independently of each other since they will not wear at the same rate when one of the same is a relatively soft wearing quick break in ring while the other thereof is a relatively hard, slow wearing, long life ring. The difference in wear rate of the rings 14 and 15 is illustrated by a comparison of Figures 2 and 3 wherein it is shown that when the rings are new (Figure 2) they all have rounded outer peripheral edges which engage the cylinder wall 13. After a relatively short period of use, however, the quick break in ring 14 has so worn that the outer peripheral edge 19 thereof has been worn to a substantially cylindrical or flattened shape (Figure 3) while the other peripheral edges 20 of the ring 15 are still substantially rounded and have been subjected to very little wear.

To accommodate the different wear rates for the two thin rings, they are radially expanded substantially independently by causing the regions of the expander ring which engage the thin rings to be substantially independent of each other. This is accomplished in accordance with the principles of the present invention by longitudinally slotting the expander rings with slots 37 which extend through the regions of the pairs of adjacent thin ring contacting crests 35, the short radially inwardly extending crest 36, and for a substantial distance longitudinally on each side of each pair of thin ring contacting crests 35. The slots 37 have any desired axial dimension so long as they leave sufficient material axially thereof to resiliently engage the thin ring with sufficient strength to expand the thin rings in accordance with the principles of the present invention. The longitudinal dimensions of the slots 36 are such that they leave a full line of contact 34, between the expander ring and the back wall 32 of the oil ring groove 10. (Note Figures 3, 5, and 6.)

To permit convenient replacement and insertion of the expander ring in the oil ring groove and in the assembly it is provided with a split 38 at one of the crests 34.

It will be observed that numerous variations and modifications may be made without departing from the true spirit and scope of the novel concepts and principles of my invention. I, therefore, intend to cover all such modifications and variations as fall within the true spirit and scope of the novel concepts and principles of my invention.

I claim as my invention:

1. In an oil control piston ring assembly for disposition in an oil ring groove of a piston to be reciprocably disposed in a cylinder, a first relatively soft and a second relatively hard thin oil ring to lie adjacent upper and lower faces of the oil ring groove in the piston and to extend radially outwardly therefrom to engage the cylinder, an annular spacer ring to maintain said thin oil rings axially spaced, and an expander ring of resilient material to engage a back face of the groove and to engage the thin oil rings in multiple point contact therewith, said expander ring being longitudinally slotted to provide for substantially independent expansion of said thin oil rings.

2. In an oil control piston ring assembly for disposition in an oil ring groove of a piston to be reciprocably disposed in a cylinder and wherein the oil control piston ring assembly has a pair of differing hardness thin oil rings to be adjacent to upper and lower faces of the groove and be separated by a spacer ring, an expander ring of resilient material to engage inner peripheral edges of the thin oil rings in multiple point contact and to engage the back face of the groove in multiple point contact to urge the thin oil rings outwardly into peripheral engagement with the cylinder, said expander ring being longitudinally slotted to provide substantially independent expansion to said thin oil rings and accommodate differing wear rates thereof.

3. In an oil control piston ring assembly, thin oil rings having differing hardness outer peripheral edges to engage a cylinder and disposed in an oil ring groove of a piston reciprocally disposed in the cylinder, and an expander ring to engage inner peripheral edges of the thin rings operable to resiliently urge the same radially outwardly toward the cylinder substantially independently to accommodate differing wear rates for the thin rings.

4. In an oil control piston ring assembly, spaced thin oil rings having different hardness outer peripheral edges arranged to engage a cylinder and to be disposed in an oil ring groove of a piston reciprocable in the cylinder, and a substantially regular polygonal expander ring of resilient sheet metal to engage an inner wall of the oil ring groove in the piston at a plurality of points thereon and to engage inner peripheral edges of each of the thin rings at substantially twice said plurality of points, said expander ring being longitudinally slotted and having a binodal configuration between points of engagement with the inner wall of the oil ring groove to expand the thin rings substantially independently and accommodate different wear rates thereof.

5. In an oil control piston ring assembly, spaced thin oil rings having different hardness outer peripheral edges arranged to engage a cylinder and to be disposed in an oil ring groove of a piston reciprocable in the cylinder, and an expander ring to engage inner peripheral edges of the thin rings to urge the same radially outwardly, one of the thin oil rings having a plurality of close turns.

6. In an oil control piston ring assembly, spaced thin oil rings having different hardness outer peripheral edges arranged to engage a cylinder and to be disposed in an oil ring groove of a piston reciprocable in the cylinder, and an expander ring to engage inner peripheral edges of the thin rings to urge the same radially outwardly, the harder thin oil ring having a length greater than the circumference thereof whereby portions thereof overlap, the overlapping portions lying in close axial positions.

References Cited in the file of this patent

UNITED STATES PATENTS

| Number | Name | Date |
|---|---|---|
| 1,707,035 | Wuerfel | Mar. 26, 1929 |
| 1,802,573 | Ramsey | Apr. 28, 1931 |
| 1,869,108 | Marien | July 26, 1932 |
| 2,343,942 | Teetor | Mar. 14, 1944 |
| 2,361,904 | Smith | Oct. 31, 1944 |
| 2,460,431 | Phillips | Feb. 1, 1949 |